July 11, 1933.  F. W. CURTIS  1,917,504
CUTTER GRINDER
Filed Sept. 5, 1931
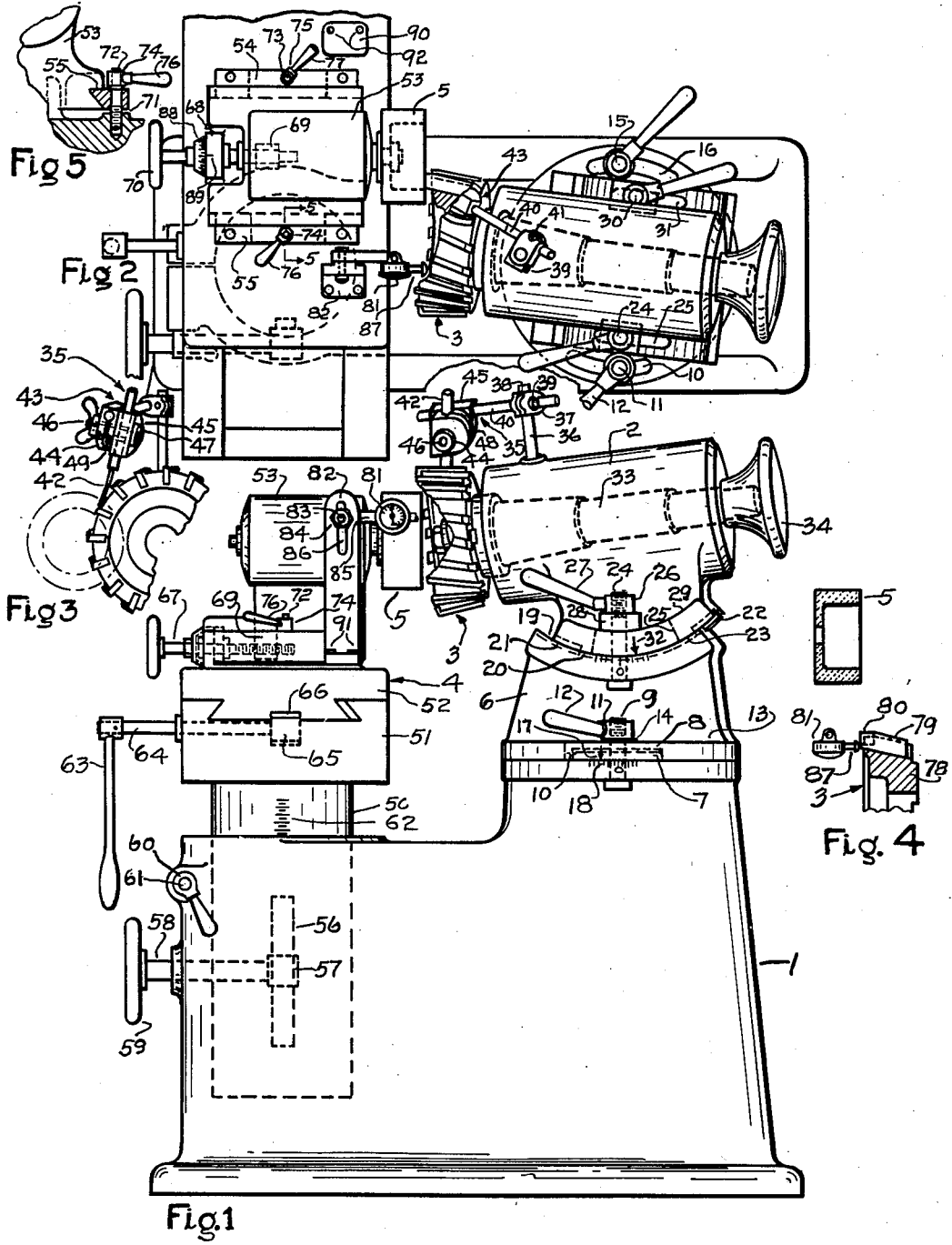
INVENTOR
Frank W Curtis
BY
Fred G Parsons
ATTORNEY Patented July 11, 1933

1,917,504

UNITED STATES PATENT OFFICE

FRANK W. CURTIS, OF WAUWATOSA, WISCONSIN, ASSIGNOR TO KEARNEY & TRECKER CORPORATION, OF WEST ALLIS, WISCONSIN

CUTTER GRINDER

Application filed September 5, 1931. Serial No. 561,406.

This invention relates to a grinding machine and more particularly to a tool grinder for face milling cutters.

Such cutters require to be ground with great accuracy as to the relative height and form of the individual cutting edges, and in the past trouble has been experienced owing in part to the wear of the grinding wheel, and in part to the relationship or set-up ordinarily used between the work and wheel.

It is a purpose of the invention to provide a grinding machine in which the different teeth of a cutter may be brought to exactly the same or any preferred relative height irrespective of the wearing away of the grinding wheel or of other causes tending to bring about variations.

Another purpose is to generally improve and simplify the construction and operation of grinders, particularly of tool grinders for face milling cutters.

The invention consists in the particular arrangement and combination of parts herein illustrated, described, and claimed, and in such modifications of the illustrated and described structure as may be equivalent to the claims.

Like reference characters have been applied to the same parts throughout the specification and drawing, in which:

Fig. 1 is a right side elevation of a machine illustrative of the invention.

Fig. 2 is a plan view of the same machine partly broken away.

Fig. 3 is a front elevation of a milling cutter indicating the action of a grinding wheel thereon.

Fig. 4 is a plan view partly in section showing the relative positions of an indicator and a grinding wheel while a reading is being taken.

Fig. 5 is a sectional view on the line 5—5 of Fig. 2.

Referring to Fig. 1, the machine comprises a base 1 supporting thereon for angular adjustment a head 2 for supporting a cutter 3 to be ground, the base also supporting, through suitable structure generally denoted by numeral 4, a grinding wheel 5 in position to operate on cutter 3.

Head 2 is supported from base 1 by means of a member 6 supported for angular adjustment in a horizontal plane on base 1, a centering portion 7 fixed with the base engaging a suitable recess 8 in member 6 for restraining it against movement other than angular movement. A stud 9 fixed with base 1 projects upwardly therefrom through a slot 10 formed in a projecting portion of member 6 as shown in Fig. 2 and carries a nut 11 having a handle 12 for tightening against a surface 13 for clamping member 6 in desired angular relation with base 1, a thrust washer 14 being interposed between the nut and surface to prevent injury to surface 13. A stud 15, Fig. 2, a duplicate of stud 9, is provided, acting in a slot 16 to assist in clamping member 6. An index 17 on member 6 cooperates with a scale 18 fixed with base 1 to permit reading the angular displacement of member 6 relative to base 1.

Member 6 supports head 2 through cylindrical or other suitably curved surfaces 19 and 20, Fig. 1, whereby the head may be adjusted to any desired angle relative to a horizontal plane. Shoes 21 and 22 fixed with head 2 project therefrom into a groove 23 to insure movement of head 2 only in the desired path. A stud 24 projects upwardly from member 6 through a slot 25 formed in a projecting portion of head 2 and has a nut 26 threaded thereon for clamping the head in desired adjusted relation with member 6. Nut 26 may be turned by means of a handle 27 fixed therewith and acts through a washer member 28 upon a surface 29 to clamp head 2 against member 6. As in the case of stud 9, a stud 30, Fig. 2, may be provided on the opposite side of head 2 acting in a slot 31, the arrangement being exactly similar to that of stud 24 in slot 25. An index 32 on head 2 cooperates with a scale fixed with member 6 to permit reading of the angle between the member and head.

Head 2 carries a work spindle 33 rotatably supported therein and provided with suitable means, not shown, for securing cutter 3 rigidly thereto in accurate alignment with the spindle, a hand wheel 34 being fixed with the spindle to facilitate rotating it when desired. By suitable adjustment of member 6 and head 2, cutter 3 may be presented to grinding wheel 5 at any desired angle.

In order to accurately locate the individual blades of cutter 3 for grinding, each in the same relation to wheel 5 as every other, a locating finger is provided generally denoted by numeral 35, Fig. 1, supported from head 2 and arranged to be universally adjustable relatively thereto. The structure comprises a stud 36 extending vertically from head 2, a member 37 having a slot 38 being adjustably clamped thereon by means of a screw 39, the member engaging and holding in clamped relation a rod 40 clamped with the member by means of a screw 41, Fig. 2. Rod 40 supports a blade member 42, Figs. 1 and 3, through the medium of a clamping device generally denoted by numeral 43 comprising members 44 and 45 adapted to be clamped together in any relative angular position by means of a screw 46 rotatably fitted in member 44 and threadedly engaging a sleeve 47 slidably journaled in member 45 and slidably keyed in member 44. Sleeve 47 has a flange portion engaging member 45 for exerting clamping pressure thereon. Thus tightening of screw 46 will clamp the members without exerting any tendency to disturb the angular relation thereof.

The members have bores for engaging rod 40 and blade 42 respectively and are slotted at 48 and 49 whereby the pressure of screw 46 will cause them to grip the rod and blade. Blade 42 may accordingly be adjusted to virtually any desired position with relation to cutter 3 and rigidly clamped therein by tightening screws 39, 41, and 46.

The locating finger 35 is normally used as indicated in Fig. 3, blade member 42 being flexible and suitably adjusted to ride over the projecting edges of the blades of cutter 3 when it is turned in one direction, but engaging the blades as shown when the cutter is turned in the opposite direction. The blades to be ground are accordingly engaged with the end of member 42 by first rotating cutter 3 until the desired blade passes under member 42 and then backing it into contact with the member. Each blade is accordingly located with respect to wheel 5 in exactly the same position as every other.

Supporting structure 4 comprises a plunger 50 guided for vertical movement in base 1 and having a head portion 51 on which is guided a slide 52. Slide 52 carries a power source 53 and above mentioned grinding wheel 5 driven therefrom, the power source being of any suitable or preferred type, in the present instance indicated as an electric motor guided in suitable slides 54 and 55, Fig. 2, fixed with slide 52 for adjustment towards and from head 2.

For vertical movement of plunger 50 a rack 56 is provided fixed with the plunger and a pinion 57 fixed with a shaft 58 journaled in base 1 engages rack 56 and when rotated by means of a hand wheel 59 fixed with shaft 58 causes raising or lowering of the plunger. The plunger may be clamped in adjusted position by means of a nut 60 acting through a bolt 61 to compress a slotted portion of base 1 about the plunger in familiar manner. The adjusted position of plunger 50 may be indicated by means of a scale 62 associated therewith and read against base 1.

Slide 52 may be traversed to move grinding wheel 5 back and forth across the blades of cutter 3 and for other purposes by a hand lever 63 fixed with a shaft 64 journaled in base 1 and having a pinion 65 fixed therewith and engaging a rack 66 fixed with slide 52.

For adjustment of motor 53 and wheel 5 a screw 67 is provided journaled in a bearing 68, Fig. 2, fixed with slide 52, the screw being fixed against axial movement therein and engaging a nut portion 69 depending from motor 53. A hand wheel 70 is provided for adjusting screw 67 and means are provided for clamping motor 53 and wheel 5 in adjusted position.

Thus slides 54 and 55 are slightly spaced from slide 52 along their middle portions, producing a clearance 71, Fig. 5. The middle portions of the slides may accordingly be depressed sufficiently to cause them to grip motor 53, there being studs 72 and 73 fixed with slide 52 and extending upwardly through suitable bores in slides 55 and 54 respectively and nuts 74 and 75 being threaded on the studs to act on the slides as apparent from Fig. 5. The nuts may be equipped with fixed actuating levers 76 and 77, if desired, to facilitate operation. It should be noted that the action of either nut would be sufficient to clamp the motor and wheel. Thus the operator need not tighten both nuts after adjusting the wheel, but merely the one most convenient to the side of the machine on which he is working.

The machine may obviously be used for any type of work for which it is found to be adapted, but it is intended especially for grinding milling cutters of the type more particularly indicated in Fig. 4. This cutter comprises a body portion 78 adapted to hold a plurality of cutting teeth or blades 79, the blades being rigidly retained in body portion 78 and having cutting inserts 80 of exceedingly hard durable material, bonded or otherwise, suitably fixed therewith. The particular material of the inserts constitutes no part of the invention, although tungsten or tantalum carbide might be mentioned as examples of typical substances contemplated.

When grinding cutters having inserts of such material, there is a relatively large amount of wearing away of wheel 5 and it is accordingly advisable to check the adjustment thereof with relation to cutter 3 quite often. In the present machine this may be accomplished by directly measuring the effect of the grinding wheel on the work and this may be done instantly and as often as desired, as follows: A dial indicator, of suitable or well-known construction, 81, Fig. 1 is rigidly but adjustably supported from slide 52 as by means of a bracket 82 removably fixed with the slide and having clamped therewith by means of a bolt 83 and nut 84 an arm 85 supporting the indicator 81. Bolt 83 traverses a slot 86 formed in bracket 82 in order that indicator 81 may be adjusted vertically to correspond with the position in which blades 79 are being ground. It is necessary merely to traverse slide 52 in a direction to remove wheel 5 from cutter 3 (up in Fig. 2) when the feeler 87 of indicator 81 will contact the surface just ground, as shown in Fig. 4, and a reading may be taken directly on the dial of the indicator. By comparing this with a previous reading the amount of material removed may be determined immediately, wheel 5 adjusted, and the grinding continued. For convenience in adjusting wheel 5, a dial 88, Fig. 2, is provided adjustably fixed with screw 67 and cooperating with an index 89 of familiar form fixed with bearing 68.

A comparison of all the teeth with each other may be obtained by merely rotating cutter 3 while indicator 81 remains in the position shown in Fig. 4, the various teeth encountering the feeler 87 one by one and their relative heights being indicated on the dial, as above explained. The teeth may thus be readily compared and ground accurately to a common height, regardless of any discrepancies that might otherwise be introduced from wear of the grinding wheel, or other sources.

The machine is shown set up for grinding a cutter of the type known as a "left-hand" cutter designed to rotate counterclockwise as seen from the front of a milling machine, or as seen in Fig. 3. Cutters designed for clockwise rotation may be as readily ground on the machine by merely reversing the rotation of wheel 5 and traversing it by means of slide 52 so as to operate on the opposite side of the axis of the cutter from that shown. Finger 35 would be suitably adjusted, head 2 set at the appropriate angle and indicator bracket 82 would be removed and attached to slide 52 on the opposite side of motor 53, a pad 90 being provided for its reception, as shown in Fig. 2, and the bracket being secured by screws 91—91 engaging holes 92—92. The grinding would then proceed in the manner above outlined with all of the above described advantages and facility.

The above being a complete description of an illustrative embodiment of the invention, what is claimed is:

1. In a grinder for milling cutters, the combination of a stationary base, a rotatable cutter supporting spindle, a rotatable grinding wheel spindle, a slide supported from said base for relative bodily reciprocatory movement of said wheel spindle and cutter spindle in a path for grinding a cutting edge of a cutter supported from said cutter spindle, means for indexing said cutter to present the teeth thereof one after another to said wheel, an indicator supported from said face in a position to contact the surface of the cutting edge being ground during a continuation in one direction of said reciprocatory movement, and a slide supporting said grinding wheel spindle for bodily adjustment relative to said indicator in a direction to compensate for wear of the grinding wheel during said reciprocatory movement.

2. In a grinder for face milling cutters, the combination of a rotatable work spindle adapted for receiving a milling cutter to be ground, a rotatable grinding wheel spindle, supporting structure for said spindles and adapted for relative bodily reciprocatory movement therebetween for grinding the cutting edges of said cutter and for relative axial adjustment about a plurality of axes, means for indexing said cutter to present the teeth thereof one after another to be ground by said wheel, and an indicator supported from said structure in a position for contact with the cutting edge being ground during a continuation of the grinding stroke in one direction of said reciprocatory movement, said structure providing a slide for bodily adjustment of said grinding spindle relative to said indicator in a direction to compensate for the wear of the grinding wheel during said reciprocatory movement.

In witness whereof I have hereto affixed my signature.

FRANK W. CURTIS.

CERTIFICATE OF CORRECTION.

Patent No. 1,917,504.                                                      July 11, 1933.

FRANK W. CURTIS.

It is hereby certified that error appears in the printed specification of the above numbered patent requiring correction as follows: Page 3, line 87, claim 1, for "face" read "base"; and that the said Letters Patent should be read with this correction therein that the same may conform to the record of the case in the Patent Office.

Signed and sealed this 22nd day of August, A. D. 1933.

M. J. Moore.

(Seal)                                                             Acting Commissioner of Patents.